United States Patent [19]
Belliveau et al.

[11] Patent Number: 5,253,813
[45] Date of Patent: Oct. 19, 1993

[54] METHOD FOR RECOVERING PVC AND URETHANE FOAM FROM COMMINGLED TRIM WASTE USING ELUTRIATORS

[75] Inventors: Philip L. Belliveau; Samuel W. Pollard, both of Rochester, N.H.

[73] Assignee: Davidson Textron Inc., Dover, N.H.

[21] Appl. No.: 962,901

[22] Filed: Oct. 19, 1992

[51] Int. Cl.⁵ .............................................. B02C 23/14
[52] U.S. Cl. ................................. 241/24; 241/DIG. 38
[58] Field of Search ............. 241/19, 20, 24, DIG. 38, 241/75, 76, 68

[56] References Cited

U.S. PATENT DOCUMENTS

| | | | |
|---|---|---|---|
| 3,848,813 | 11/1974 | Stanczyk et al. | 241/DIG. 38 |
| 4,036,441 | 7/1977 | Basten et al. | 241/DIG. 38 |
| 4,043,513 | 8/1977 | Hoberg et al. | 241/24 |
| 4,044,695 | 8/1977 | Mackenzie et al. | 241/DIG. 38 |
| 5,042,725 | 8/1991 | Grimmer | 241/19 |

*Primary Examiner*—Douglas D. Watts
*Attorney, Agent, or Firm*—Reising, Ethington, Barnard, Perry & Milton

[57] ABSTRACT

A method and apparatus for reclaiming urethane foam and polyvinyl chloride plastic material from composite plastic articles (18). The articles pass through a granulator (23) and pass through a first elutriator (36) where two streams of particles are formed. A denser stream passes to a second elutriator (50) where at its exit (56) substantially pure polyvinyl chloride particles are passed into bin (58). A less dense stream of particles pass to a screen separator (64) where intermediately sized particles are sorted onto conveyor (74) which passes substantially pure urethane foam to baler (76).

9 Claims, 1 Drawing Sheet

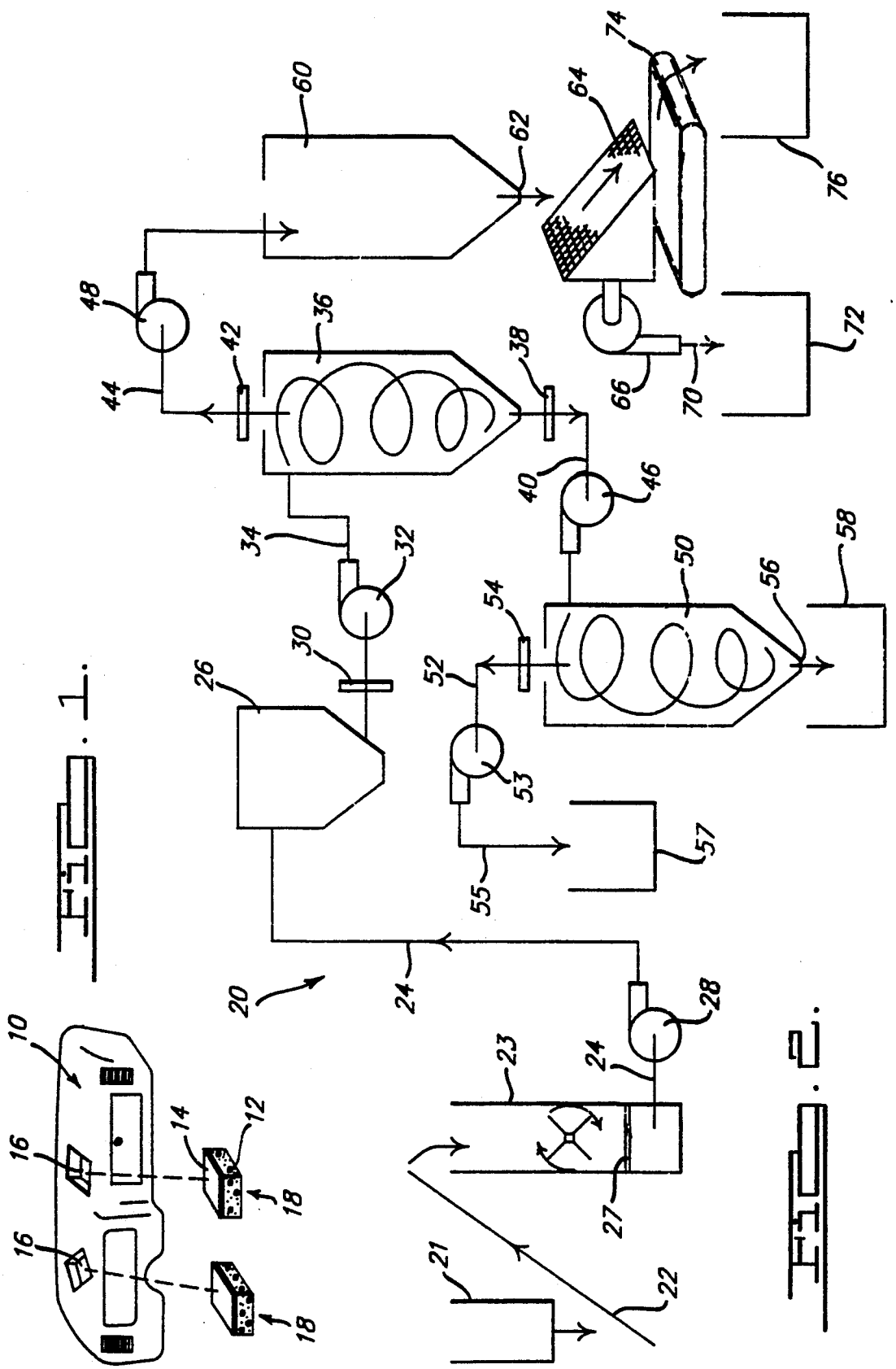

METHOD FOR RECOVERING PVC AND URETHANE FOAM FROM COMMINGLED TRIM WASTE USING ELUTRIATORS

TECHNICAL FIELD

The field of this invention relates to a method for recycling plastic parts and more particularly to recycling the constituent plastics of composite plastic parts.

BACKGROUND OF THE DISCLOSURE

Recycling waste trim is becoming economically feasible due to the increasing value of the waste material, the increasing costs of solid waste disposal and the decreasing availability of landfills. Many plastic articles are composite in nature. Articles, for example, automotive instrument panels may have a shell of harder denser plastic material such as polyvinyl chloride (PVC) and a backing made from a less dense foam material such as urethane. After formation of the article, the article is trimmed or cut into its final shape. Excess trim results from each article. It has been proposed to recycle the excess trim and reclaim the component plastic materials.

Reclaiming plastic materials have difficulties not found for other types of materials. Plastic material is not magnetic therefor the use of magnetic fields often used in the reclamation of ferrous materials is useless. It has been proposed to recycle the material of the composite plastic by chopping the composite plastic into smaller fragments and sorting the fragments by the type of plastic. Liquid float tanks have been proposed where less dense foam particles float and more dense vinyl particles sink. This method requires de-watering of the particles and subsequent drying which adds to the recycling costs. Furthermore many plastics have a density near that of water and thus the liquid float tanks do not adequately sort out these types of plastic materials Another process is disclosed in U.S. Pat. No. 5,042,725 issued to Robert A. Grimmer on Aug. 27, 1991. The Grimmer patent discloses a process for separating urethane foam and PVC particles from composite plastic parts by granulation of the composite parts to constituent foam and PVC particles. Larger particles are then separated from smaller particles by a screen. After the particles are sized, the foam and PVC particles are then separated by passing them through a tilted fluid bed. The bed uses air flow to levitate the less dense foam particles and allows the PVC particles to be at a lower level. The bed is vibrated to direct the foam and PVC particles to different ducts.

It has been found that the presence of only a small percent of foam in the reclaimed PVC is enough to contaminate the reclaimed material such that it becomes unacceptable for known subsequent manufacturing processes. Furthermore only a small percentage of contamination is enough to render the reclaimed foam useless for further processing.

What is needed is a reclamation process for composite urethane foam and PVC plastic parts that produces purer reclaimed PVC and foam than is known in the prior art.

SUMMARY OF THE DISCLOSURE

In accordance with one aspect of the invention, a method reclaims the component materials of a composite plastic article having a first plastic component and a second plastic component of lesser density than the first plastic component. The method includes reducing the particle sizes of the composite plastic article to form a composite mixture of comminuted plastic particles of the first and second components under a first predetermined size. Preferably, the composite plastic article is comminuted by a granulator. The composite mixture of plastic particles is transported by an air stream to a surge bin.

The mixture of plastic particles is then transported from the surge bin by an air stream bin to a first cyclone elutriator. The cyclone elutriator sorts the mixture of comminuted particles into a first mixture that is dominantly comprised of the first plastic component and a second mixture that is dominantly comprised of the second plastic component.

The second mixture is then transported to a second surge bin. The particles in the second mixture separated into a first group below a second predetermined size and an intermediate group having particles between the first and second predetermined sizes. Preferably, the second mixture is positioned on a screen and the first group is vacuumed through the screen to separate it from the larger intermediately sized particles of the second plastic component.

The first mixture is separated by a second cyclone elutriator into a less dense mixture portion and a denser purer group of particles that are substantially comprised of particles of the first plastic component. The less dense mixture portion is drawn from the second cyclone elutriator by an air stream. The denser pure group of particles are then packaged to be reused. The less dense mixture portion is considered waste product.

Desirably, the method is used with composite plastic articles that have a plastic shell formed from polyvinyl chloride (PVC) and a foam backing made from urethane.

According to another aspect of the invention, a method reclaims the component parts of a composite plastic article having a plastic shell with a layer of backing foam of lesser density than the plastic shell. The method includes comminuting the composite plastic article to form a mixture of plastic shell particles and plastic foam particles under a first predetermined size. The mixture of comminuted particles are then sorted by a first cyclone elutriator into a foam dominant mixture and a plastic shell dominant mixture. The particles in the foam dominant mixture is sorted into a first group of particles sized below a second predetermined size and a group of particles sized between said first and second predetermined sizes.

The plastic shell dominant mixture is transported to a second cyclone elutriator where it is sorted into a less dense mixture and a denser purer group of particles that is substantially plastic shell particles.

In accordance with another aspect of the invention, an apparatus for performing the above identified process includes a comminutor or granulator for chopping the composite articles into particles and two cyclone elutriators for sequentially sorting out denser plastic particles from less dense plastic particles.

BRIEF DESCRIPTION OF THE DRAWINGS

Reference now is made to the accompanying drawings in which:

FIG. 1 is a schematic view of an automotive interior composite plastic article formed from two different plastic components that can recycled by the present invention;

FIG. 2 is a diagrammatic view of a recycling apparatus according to the invention.

DETAILED DESCRIPTION OF THE PREFERRED EMBODIMENT

Referring now to FIG. 1, a molded automotive instrument panel 10 has a composite plastic construction. One component is a urethane foam backing and a second component is an exterior skin 14 of polyvinyl chloride joined with the backing 12 at an interface. The panel 10 has cutout areas 16 for the mounting of gages, vents, radios and other automotive accessories. The cut out areas result in excess trim blocks 18.

The excess trim blocks 18 are introduced to a recycling apparatus 20 illustrated in FIG. 2. The blocks 18 and other excess trim are transported from a storage hopper 21 via a conveyor 22 to a powered granulator or comminutor 23. The granulator 23 chops the blocks 18 into particles of separate foam and vinyl chips which are passed through an internal screen 27 having $\frac{1}{8}$" openings.

The composite mixture of urethane foam and vinyl particles is then conveyed through a conduit 24 from the granulator 23 to a surge bin 26. The air flow within conduit 24 is caused by power blower 28. The surge bin 26 collects the received composite mixture of particles. The mixture of shell and foam particles are then drawn from a lower section of surge bin 26 through a slide gate valve 30 by a vacuum draw from blower 32. The vacuum draw is set between 1.7 to 2.0 inches of water. The mixture of vinyl and foam particles is then transported through conduit 34 to a cyclone elutriator 36.

The cyclone elutriator 36 has a cyclonic air flow therein which separates the less dense foam particles from the more dense PVC particles. The cyclone elutriator 36 may be commercially available separator from Sterling Systems. The size and model of the elutriator is determined by the recycling capacity needed or desired. The particles are separated such that a first mixture that is dominantly PVC particles passes from a lower section of the elutriator 36 through a slide gate valve 38 into conduit 40 and a second mixture that is dominantly foam particles passes from an upper section of the elutriator 36 through slide gate valve 42 into conduit 44.

Air flow caused by blowers 46 and 48 transports the respective first and second mixtures in respective conduits 40 and 44. The vacuum draw in conduit 40 from slide gate valve 38 is set between 2.8 and 3.2 inches of water.

The first mixture of dominantly PVC particles is transported by air flow to a second elutriator 50. The elutriator 50 has substantially the same construction as the first elutriator 36. A conduit 52 connected to the upper portion of the elutriator has a vacuum draw caused by blower 53 which separates less dense particles in the first mixture. The slide gate 54 controls the draw between 10.0–10.6 inches of water. The less dense particles are delivered through conduit 55 to a bin 57. Denser particles pass out of the lower exit 56 to a bin 58 for shipping. The denser particles exiting exit 56 are substantially PVC particles. Results of less than 1% contamination of foam have been achieved in the denser particle stream exiting exit 56.

The second mixture of dominantly foam material is drawn by a vacuum created by blower 48 through slide gate valve 42 into conduit 44. The conduit 44 leads to a second surge bin 60. The surge bin 60 separates the conveying air flow from the second mixture of dominantly foam particles. The foam particles pass through lower exit 62 onto a screen separator 64. A vacuum blower 66 draws smaller sized particles characterized as fines and dust through the screen. The particle size passing through screen separator 64 is substantially smaller than the $\frac{1}{8}$ inch sized particles formed by the granulator 23. The vacuum blower 66 passes the fines and dust through the conduit 70 to a bin 72.

The intermediately sized foam particles sized larger than the defined fines and dust are transported from screen separator 64 onto conveyor 74 which transports the intermediately sized foam particles to a baler 76 where it is packaged. The contamination within the intermediately sized foam particles is also found to be less than 5% by weight which makes it acceptably pure for recycling.

The purity of the reclaimed PVC in bin 58 and the urethane foam in baler 76 has been found to better than the purity achieved in the prior art processes. The purity is achieved with an apparatus that has fewer moving parts and needs virtually no preventive maintenance.

Variations and modifications are possible without departing from the scope and spirit of the present invention as defined by the appended claims.

The embodiments in which an exclusive property or privilege is claimed are defined as follows:

1. A method for reclaiming the component parts of a composite plastic article having a first plastic layer with a layer of backing foam of lesser density than the plastic shell, the method characterized by;
    comminuting the composite plastic article to form a mixture of first layer plastic particles and plastic foam particles under a first predetermined size;
    sorting said mixture of comminuted particles by a first cyclone elutriator into a foam dominant mixture and a first layer plastic dominant mixture;
    separating the particles in the said foam dominant mixture to a first group of particles below a second predetermined size and a group of intermediately sized particles sized between said first and second predetermined sizes; and
    sorting said first layer plastic dominant mixture by a second cyclone elutriator into a less dense mixture and a denser purer group of particles that is substantially first layer plastic particles.

2. A method as defined in claim 1 further characterized by;
    said plastic foam being urethane and said first layer plastic being polyvinyl chloride.

3. A method as defined in claim 1 further characterized by;
    vacuuming said first group of said foam through a screen to separate said first group of said foam from said larger intermediate group of said foam.

4. A method for reclaiming the component parts of a composite plastic article having a first plastic component and a second plastic component of lesser density than the first plastic component, the method characterized by;
    comminuting the composite plastic article to form a composite mixture of comminuted plastic particles of said first and second components under a first predetermined size;
    transporting said composite mixture of plastic particles by an air stream to a surge bin;

transporting said mixture of plastic particles by an air stream from said surge bin to a first cyclone elutriator;

sorting said mixture of comminuted particles by said first cyclone elutriator into a first mixture that is dominantly comprised of said first plastic component and a second mixture that is dominantly comprised of said second plastic component;

transporting said second mixture to a second surge bin;

separating the particles in the said second mixture into a first group of particles sized below a second predetermined size and a second group of intermediately sized particles sized between said first and second predetermined sizes;

sorting said first mixture by a second cyclone elutriator into a less dense mixture portion and a denser purer group of particles that is substantially particles comprised of said first plastic component; and vacuum drawing said less dense mixture portion from said second cyclone elutriator by an air stream.

5. A method as defined in claim 4 further characterized by;

vacuuming said second mixture through a screen to separate said first group from said second group of said particles of said second plastic component.

6. A method as defined in claim 5 further characterized by;

said second plastic component being urethane foam and said first plastic component being polyvinyl chloride.

7. A recycling apparatus for sorting a the component materials of a composite plastic articles, said apparatus characterized by;

a comminutor for comminuting composite plastic articles into particles forming a composite mixture of component plastic materials under a first predetermined size;

a first cyclone elutriator for sorting said mixture of comminuted particles into a first mixture that is dominantly comprised of said first plastic component and a second mixture that is dominantly comprised of said second plastic component;

a separating mechanism for separating the particles in the said second mixture into a first group of particles sized below a second predetermined size and a second group of intermediately sized particles sized between said first and second predetermined sizes;

a second cyclone elutriator for sorting said first mixture by into a less dense mixture portion and a denser purer group of particles that is substantially comprised of particles of said first plastic component;

a vacuum system for drawing said less dense mixture portion from said second cyclone elutriator by an air stream;

conduit means for transporting said particles from said comminutor to said first elutriator and from said elutriator to said separating mechanism and said second cyclone elutriator by a gaseous flow; and blower means for forming said gaseous flow in said conduit means.

8. An apparatus as defined in claim 7 further characterized by;

a first surge bin in line with said conduit means between said comminutor and said first cyclone elutriator; and a second surge bin in line with said conduit means between said first cyclone elutriator and said separating mechanism for said second mixture.

9. An apparatus as defined in claim 8 further characterized by;

said separator for said second mixture including a screen positioned downstream from said second surge bin for screening particles of said first group of particles sized below said second predetermined size and said second group of intermediately sized particles sized between said first and second predetermined sizes.

* * * * *